United States Patent Office 3,471,569
Patented Oct. 7, 1969

3,471,569
PROCESS FOR PRODUCING ACETALS AND HEMIACETALS OF PHOSPHONIUM SALT COMPOUNDS
Herwig Freyschlag, Werner Reif, Axel Nuerrenbach, and Horst Pommer, Ludwigshafen (Rhine), Germany, assignors to Badische Anilin- & Soda-Fabrik Aktiengesellschaft, Ludwigshafen (Rhine), Germany
No Drawing. Filed Nov. 24, 1964, Ser. No. 413,617
Claims priority, application Germany, Nov. 30, 1963, B 74,477; Nov. 14, 1964, B 79,333
Int. Cl. C07f 9/02, 9/28; C07c 41/00
U.S. Cl. 260—606.5    1 Claim

ABSTRACT OF THE DISCLOSURE

Process of obtaining unsaturated aldehydes and their functional derivatives by converting a compound such as

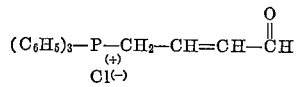

into its functional aldehyde derivative selected from the class consisting of acetal, hemiacetal, mercaptal, aminal, acylal, oxime, hydrazone, semicarbazone and Schiff's base, converting this derivative into its corresponding ylid, and then reacting the ylid with an aldehyde or ketone. The product is an unsaturated aldehyde of longer chain length or its functional aldehyde derivative which is easily converted into the aldehyde. The final aldehyde products have known utility, e.g. as in the production of food dyes, vitamins and other useful compounds.

---

In two works (Ber. Akad. Wiss. Ud SSR 138, 387–398, (1961) and J. Gen. Chem. (USSR) 32 (94), 3105–3106, (1962)), S. M. Makin has described the production of $C_{19}$-aldehyde and of retinene by reaction of $C_{14}$-aldehyde and β-ionylideneacetaldehyde with ylids which have been prepared from the phosphonium salts I and II:

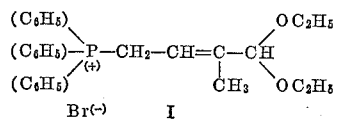

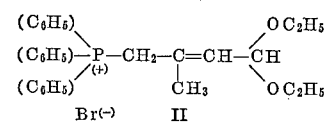

by reaction with methylate. There are thus formed as reaction products the acetals of $C_{19}$-aldehyde and of retinene which are split with dilute acids. The salts I and II are obtained from the bromides Ia and IIa:

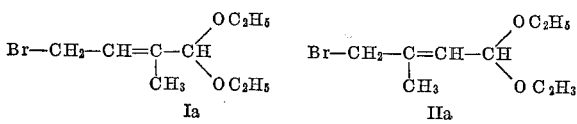

by reaction with triphenyl phosphine by a conventional method. Production of the bromides is effected by the action of N-bromo-succinimide on the ethoxyisoprenes Ib and IIb:

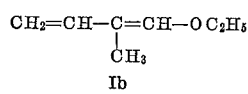 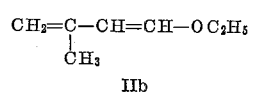

in ethanol solution. The ethoxyisoprenes required for this method are not easily accessible. Another disadvantage is that reactions with N-bromosuccinimide are extremely difficult to carry out industrially because in large amounts the reagent tends to uncontrollable decomposition reactions. Moreover only acetals can be obtained direct by this method, and no other aldehyde derivatives.

We have now found that mono- or poly-unsaturated aldehydes or if desired their functional derivatives are obtained in an industrially advantageous way by converting phosphonium salts having the formula:

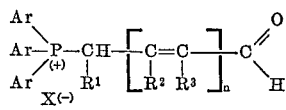

III in which Ar denotes an aryl radical or an aryl radical substituted by alkyl or alkoxy groups, $R^1$ denotes a hydrogen atom or an alkyl group, $R^2$ denotes a hydrogen atom or an alkyl group, $R^3$ denotes a hydrogen atom or an alkyl group and $n$ denotes an integer from 0 to 12, preferably 0 to 6, into their functional aldehyde derivatives and reacting these with aldehydes or ketones via their ylids by a type of Wittig reaction. The aromatic radical indicated by Ar in the Formula III is preferably phenyl which may bear methyl or methoxy as a substituent, i.e. for example toluyl or methoxyphenyl. The alkyl radicals $R^1$ to $R^3$ are preferably methyl and/or ethyl. The term derivatives of aldehydes as used in connection with the present invention denotes those which still bear the hydrogen atom on the carbonyl carbon atom. A definition of the derivatives is contained in the textbook of organic chemistry by F. Klages, 1st volume, 1952, Walter de Gruyter & Co., Berlin W 35, page 273.

In the conversion of the compounds having the Formula III, for example into the acetals, for example with alcohols and acid catalysts, compounds having the formula

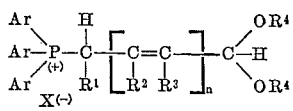

IV in which $R^4$ denotes an alkyl group and $X(-)$ denotes a monovalent anion, are formed. The monovalent anion $X^{(-)}$ may be free from further negative charges, such as is the case for example with the chlorine ion and the bromine ion. The monovalent anion $X^{(-)}$ may contain an additional negative charge, such as is the case with the sulfate ion. Ions of strong or fairly strong acids are preferred, for example ions of hydrochloric acid, sulfuric acid or organic sulfonic acids.

When the process according to this invention is carried out with acetals, derivatives of aldehydes or ketones are obtained which contain in the molecule the radical:

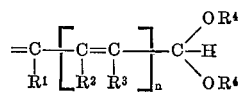

in which $R^4$ is preferably a lower alkyl radical, such as methyl, ethyl, propyl, isopropyl and butyl radicals.

The acetals may then be split to the free aldehydes with dilute acids.

The new process is not limited to the acetals; rather it is possible to convert compounds having the Formula III into any functional aldehyde derivative, such as hemiacetals, acylals, cyclic acetals, mercaptals, aminals, oximes, hydrazones, semicarbazones, Schiff's bases, from which the corresponding higher aldehyde derivatives may be formed via the ylids and their condensation with aldehydes or ketones. The functional derivatives of the aldehydes may therefore be represented by the Formula V:

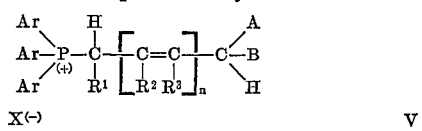

in which Ar, $R^1$, $R^2$, $R^3$, $n$ and $X^{(-)}$ have the meanings given above while A and B denote any functional derivative of the aldehyde group, such as acetals, hemiacetals, mercaptals, aminals, acylals, hydrazones, oximes, Schiff's bases. Thus A and B may have the following meanings:

A—alkoxy, B—alkoxy
A—alkoxy, B—hydroxy
A—alkylmercapto, B—alkylmercapto
A—$N(R')_2$, B—$N(R')_2$ ($R'$ denoting alkyl)
A—acyloxy, B—acyloxy
A+B——=N—NH—R" (R" denoting for example phenyl or 2,4-dinitrophenyl)
A+B——=N—$NHCONH_2$
A+B——=NOH
A+B——=N-alkyl.

The functional adlehyde derivatives having the Formula V are prepared from compounds having the Formula III by conventional methods. It is surprising that neither has the phosphonium salt grouping

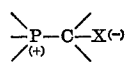

present in the same molecule any disturbing effect nor is it itself affected or destroyed. Thus it is not possible by the method of S. M. Makin to prepare the compounds IV from compounds III. On the other hand it is known that phosphorus ylids are capable of reacting for example with the grouping —CH=N— (cf. for example H. J. Bestmann and F. Seng, Angew. Chem. 75 (1963), 475). It was not therefore to be expected that in the ylids prepared from the compounds V the ylid grouping would not react with the functional groups.

Examples of phosphonium salts having the Formula III are: triphenylformylmethyl phosphonium chloride, triphenyl-β-formylcrotyl phosphonium chloride, triphenyl-β-formylcrotyl phosphonium bromide, triphenyl-α-formylcrotyl phosphonium chloride, triphenyl-5-formyl-3-methylpentadiene-(2,4)-yl phosphonium chloride and triphenyl-7-formyl-3,7-dimethylheptatriene-(2,4,6)-yl phosphonium chloride.

It is not necessary to isolate the aldehyde derivatives V in the process according to this invention. They may rather be subjected immediately after their preparation to the Wittig reaction after they have been converted with proton acceptors into the ylids. Organic or inorganic compounds may be used as proton acceptors. For example basic substances having a pk value of less than about 9, such as alcoholates, for example the alkali metal alcoholates sodium methylate or sodium ethylate, ammonia, amines, as for example the alkylamines trimethylamine, triethylamine, diethylamine or for example the heterocyclic amine piperidine, and above all aqueous alkali solutions, such as caustic soda or caustic potash solution. It is advantageous to use equivalent amounts of the proton acceptor with reference to the phosphonium salt. Excessive amounts of proton acceptors are not detrimental. When alcoholates are used as proton acceptors they are preferably used in anhydrous methyl alcohol or ethyl alcohol. The amines may also be used in alcohols with advantage.

Reaction of the ylids (prepared from the compounds V by conventional methods, for example by the action of alcoholates) with aldehydes or ketones leads to the same functional derivatives of higher aldehydes. These derivatives may be isolated or immediately split into the aldehydes on which they are based. Isolation of the aldehyde derivative from the reaction product is always recommendable when the derivative is considerably more stable than the free aldehyde. This constitutes another advantage of the new process. Furthermore the new process permits the production of aldehyde derivatives by means of the Wittig reaction. Finally the process according to this invention prevents further reaction of the new aldehydes formed with excess ylid.

All aldehydes and ketones are suitable in principle for reaction with the ylids prepared from compounds having the Formula V. The class of aliphatic aldehydes, which may bear cycloaliphatic or aromatic radicals, and the class of conjugated unsaturated aldehydes may be given as examples of aldehydes which may be reacted by the process according to this invention. The same is true of the ketones. Aldehydes and ketones which are suitable as initial products for syntheses in the carotenoid series, such as β-ionone, α-ionone, $C_{14}$-aldehyde, β-ionylideneacetaldehyde, retinene, the apocarotenals and the dialdehydes known from carotene chemistry, such as $C_{10}$-, $C_{14}$- and $C_{20}$-dialdehydes, have a particular importance. Reaction of these aldehydes or ketones with ylids derived from compounds V may be carried out at temperatures of about $-30°$ to $+150°$ C., preferably at about $0°$ to $80°$ C., depending on the type of reactants. The same solvents are suitable as have been used for the preparation of the ylids, namely hydrocarbons, such as hexane, cyclohexane, octane, benzene or toluene, chlorinated hydrocarbons, such as methylene chloride, chloroform or chlorobenzene, alcohols, such as methanol, ethanol or isopropanol, acid amides, such as formamide, methylformamide or dimethylformamide, and acid nitriles, such as acetonitrile. In some cases water may also be used or co-used. An expert will have no difficulty in selecting from the solvents suitable for syntheses in organic chemistry, those which may be used for the process according to this invention.

The above-mentioned difficulties of the Makin method are circumvented by the process according to this invention. Neither alkoxyisoprenes nor N-bromosuccinimide are necessary for the production of the phosphonium salts III. They may be prepared by conventional methods, for example by reaction of appropriate haloaldehydes with tertiary phosphines. Thus for example triphenyl-β-formylcrotyl phoshonium chloride ($Ar=C_6H_5$; $R^1$ and $R^2=H$; $R^3=CH_3$; $n=1$; $X^{(-)}=Cl^-$ in Formula III) is obtained in a good yield from β-formylcrotyl chloride and triphenyl phosphine by heating in toluene solution for one to two hours. In contrast, reaction periods of fourteen to forty-eight hours are required for the production of the acetals I and II from Ia and IIa with triphenyl phosphine, because halogen atoms in α-position to ether or acetal groupings are extremely difficult to move. The same is true of compounds in which the carbon atom to which the halogen atom is attached and the acetal group are separated by one or more conjugated double bonds.

The substances obtained according to this invention are suitable for the production of dyes, in particular food dyes, vitamins, pharmaceuticals, plant protection agents or optical brighteners.

The invention is further illustrated by the following examples. The parts specified in the examples are parts by weight.

EXAMPLE 1

7.6 parts of triphenyl-3-formylbutene-2-yl - 1 phosphonium chloride in 100 parts of ethanol is boiled with 6 parts of ethyl o-formate and a small crystal of p-toluenesulfonic acid for two hours. The whole is allowed to cool, 1.08 parts of sodium methylate and 1.64 parts of 2,7-dimethyloctatriene-(2,4,6)-dial ($C_{10}$-dialdehyde) are added and heating is continued at the boiling point for another four hours in a nitrogen atmosphere. The whole is again cooled. Ice water containing a pinch of sodium bicarbonate is added and the whole is extracted with ether. The ether extract is washed several times with methanol containing 60 parts of water and dried over sodium sulfate. The ether is distilled off. 3.96 parts of an orange red oil remain from which the tetraethyl acetal of crocetin dialdehyde is obtained by crystallization from petroleum ether. It forms orange needles having a melting point of 128° to 129° C. $\lambda_{max.}$=379, 400 and 425 millimicrons;

$E_{1\,cm.}^{1\%}$=1780, 3000, and 3170 (measured in cyclohexane)

EXAMPLE 2

3,8 parts of triphenyl-3-formylbutene-2-yl-1 phosphonium bromide in 50 parts of ethanol is boiled for two hours with 3 parts of ethyl o-formate and a small crystal of p-toluenesulfonic acid. The whole is cooled and a solution of 0.23 part of sodium in 10 parts of ethanol and then 2.84 parts of vitamin A aldehyde are added. The whole is boiled in a nitrogen atmosphere for another four hours. The cooled reaction mixture has water added to it and is extracted the ether. The ethereal solution is stirred with 1 N sulfuric acid under nitrogen for one hour in order to split the acetal. The ethereal phase is dried over sodium sulfate and the solvent distilled off. 3.21 parts of an orange yellow oil remain from which, after isomerization by boiling in petroleum ether of high boiling range (80° to 100° C.) and crystallization from petroleum ether of low boiling range (40° to 60° C.), β-apo-12′-carotenal can be obtained in crystalline form. It forms yellow crystals having a melting point of 87° to 88° C.; $\lambda_{max.}$=415 millimicrons;

$E_{1\,cm.}^{1\%}$=2140 (measured in cyclohexane)

EXAMPLE 3

10 parts of triphenyl-3-formylbutene-2-yl-1 phosphonium chloride is heated to boiling point with 20 parts of isopropanol and a small crystal of p-toluenesulfonic acid. The solvent is distilled off slowly over a period of four hours. 11.6 parts of triphenyl-3-(hydroxyisopropoxymethyl)-butene-2-yl-1 phosphonium chloride remains as an oil which crystallizes throughout. After it has been precipitated from a methylene chloride solution with tetrahydrofurane, the hemiacetal melts at 87° to 90° C. Nuclear magnetic resonance and infrared spectra and also analysis confirm the constitution. Anlytical values are— found: C, 70.3%; P, 6.9%; calculated: C, 70.7%; P, 7.0%.

4.4 parts of the triphenyl - 3 - (hydroxisopropoxymethyl)-butene-2-yl-1 phosphonium chloride is dissolved in 20 parts of methanol and then 0.23 part of sodium in 10 parts of methanol and 2.84 parts of vitamin A aldehyde are added. The whole is boiled for one hour under reflux in a nitrogen atmosphere. Water is added to the resultant mixture and it is then extracted with ether. The ethereal solution is stirred for half an hour with 2 N sulfuric acid to split the hemiacetal. The ethereal phase is dried and the solvent is distilled off. 3.3 parts of an orange red oil remain. After it has been crystalized from petroleum ether of low boiling point, β-apo-12′-carotenal can be obtained in crystalline form. It forms yellow orange crystals having a melting point of 88° to 92° C.; $\lambda_{max.}$=414 millimicrons;

$E_{1\,cm.}^{1\%}$=2130 (measured in cyclohexane)

EXAMPLE 4

7.6 parts of triphenyl-3-formylbutene-2 - yl - 1 phosphonium chloride in 50 parts of methanol is heated with 2.1 parts of methyl o-formate and a small crystal of p-toluenesulfonic acid. The whole is cooled and 0.36 part of water is added and the mixture evaporated to dryness. 8.2 parts of a crystalline substance remains which according to IR and NMR spectra is the hemiacetal. Melting point: 113° to 115° C. Analytical values—found: C, 69.6%; P, 6.4%; calculated; C, 69.8%; P, 6.3%

30 parts of methanol and 0.23 part of sodium in 10 parts of methanol are added to 4.3 parts of the methyl hemiacetal of triphenyl-3-formylbutene-2-yl-1 phosphonium chloride thus obtained. After 3.5 parts of β-apo-12′-carotenal has been added, the whole is heated under reflux for two hours in a nitrogen atmosphere. Water and dilute sulfuric acid are added to the cooled reaction mixture which is then extracted with octane. The octane phase is dried over sodium sulfate and the solvent is distilled off. 4.2 parts of a deep red crystal mash remains. After recrystallizing it from a mixture of benzene and methanol, β-apo-8′-carotenal is obtained in crystalline form. Melting point: 137° C.; $\lambda_{max.}$=458 millimicrons;

$E_{1\,cm.}^{1\%}$=2600 (measured in cyclohexane)

EXAMPLE 5

30 parts of chloroform and 2.5 parts of dithioglycol are added to 10 parts of triphenyl-3-formylbutene-2-yl-1 phosphonium chloride. A trace of hydrogen chloride is passed in and the whole then stirred for five hours at room temperature.

After the whole has been concentrated, 12.1 parts of the mercaptal is obtained as an oil which is dissolved in 50 parts of methanol. 0.61 part of sodium in 10 parts of methanol and 7.5 parts of vitamin A aldehyde are added. The whole is boiled under reflux for three hours in a nitrogen atmosphere. Mercury(II) chloride in acetone is added and the whole stirred for another two hours at 40° C. to split the mercaptal. The mixture is extracted with octane, the product is dried and the solvent distilled off. 8.2 parts of a red oil remains ($\lambda_{max.}$=414 millimicrons). After it has been recrystallized from low boiling petroleum ether, the β-apo-12′-carotenal can be obtained in crystalline form: Yellow orange crystals, melting point 91° to 94° C.; $\lambda_{max.}$=414 millimicrons;

$E_{1\,cm.}^{1\%}$=2160 (measured in acetone)

EXAMPLE 6

10.5 parts of the dinitrophenylhydrazone of triphenyl-3-formylbutene-2-yl-1 phosphonium chloride is dissolved in 200 parts of ethanol. 6.35 parts of vitamin A aldehyde and 4.1 parts of a 30% solution of sodium methylate in methanol are then added. After stirring for 20 hours at room temperature, the reaction mixture is poured into 250 parts of 10% sulfuric acid and extracted with 100 parts of methylene chloride. On drying and evaporation of the solvent, 14.5 parts of a deep red oil remains ($\lambda_{max.}$=462 millimicrons, measured in dioxane). After dissolving it in a small amount of benzene and precipitating it with petroleum ether, deep red crystals are obtained melting at 202 to 204° C.; $\lambda_{max.}$=462 millimicrons;

$E_{1\,cm.}^{1\%}$=905 (measured in dioxane)

EXAMPLE 7

20 parts of the semicarbazone of triphenyl-3-formylbutene-2-yl-1 phosphonium chloride and 12.9 parts of vitamin A aldehyde are dissolved in 400 parts of dimethyl formamide. 5 parts of diethylamine is added, and the whole is stirred for three hours at 100° C. The solution is allowed to cool, poured into dilute sulfuric acid and extracted with 200 parts of octane. The octane phase is dried and concentrated. 9 parts of a red oil remains ($\lambda_{max.}$=414 millimicrons and 437 millimicrons, measured in ethanol). After it has been crystallized from ethanol, orange red crystals are obtained melting at 219 to 223° C.; $\lambda_{max.}$=414 millimicrons;

$E_{1\,cm.}^{1\%}$=1875; and $\lambda_{max.}$=438 millimicron; $E_{1\,cm.}^{1\%}$=1720 (measured in ethanol)

EXAMPLE 8

2 parts of the oxime of triphenyl-3-formylbutene-2-yl-1 phosphonium chloride and 1.45 parts of vitamin A aldehyde are dissolved in 100 parts of ethanol. 0.75 part of diethylamine is added, and the whole is stirred for two days at room temperature. The reaction mixture is poured into dilute sulfuric acid and extracted with methylene chloride. On drying and evaporation, 2.2 parts of a red residue is obtained ($\lambda_{max.}$=400 millimicrons, measured in methanol), from which, by chromatography using aluminum oxide, orange red needles are obtained melting at 168 to 170° C.; $\lambda_{max.}=399$ millimicrons; $E_{1\,cm.}^{1\%}=2520$; and $\lambda_{max.}=419$ millimicrons; $E_{1\,cm.}^{1\%}=2400$ (measured in methanol)

We claim:
1. A process for the production of a compound selected from the group consisting of the acetals and hemiacetals of a phosphonium salt of the formula

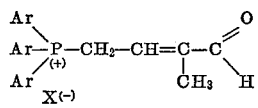

wherein Ar denotes a member selected from the group consisting of phenyl, toluyl and methoxyphenyl and X denotes the equivalent of an anion, said process comprising reacting said phosphonium salt with a compound selected from the group consisting of lower alkanols and lower alkyl o-formates in the presence of an acid catalyst to convert the aldehyde group

of said phosphonium salt into its corresponding acetal or hemiacetal.

References Cited

Johnson: Ylid Chemistry (1966), pp. 140–152.
Trippett et al.: Jour. Chem. Soc. (London), 1961, pp. 1266–1272.

BERNARD HELFIN, Primary Examiner

U.S. Cl. X.R.

260—501.21, 554, 566, 570.5, 576, 598, 599